United States Patent
Reiter et al.

(10) Patent No.: US 8,862,274 B2
(45) Date of Patent: Oct. 14, 2014

(54) ELECTRO-HYDRAULIC AUXILIARY CONTROL WITH OPERATOR-SELECTABLE FLOW SETPOINT

(75) Inventors: Dennis P. Reiter, Dubuque, IA (US); Paul J. Ernst, Dubuque, IA (US); Glenn O. Scheer, Durango, IA (US)

(73) Assignee: Deere & Company, Moline, IL (US)

( * ) Notice: Subject to any disclaimer, the term of this patent is extended or adjusted under 35 U.S.C. 154(b) by 704 days.

(21) Appl. No.: 12/663,545

(22) PCT Filed: Jun. 8, 2007

(86) PCT No.: PCT/US2007/013615
§ 371 (c)(1),
(2), (4) Date: May 19, 2010

(87) PCT Pub. No.: WO2008/150267
PCT Pub. Date: Dec. 11, 2008

(65) Prior Publication Data
US 2010/0292851 A1 Nov. 18, 2010

(51) Int. Cl.
*E02F 9/22* (2006.01)
*A01B 63/00* (2006.01)
*E02F 9/26* (2006.01)

(52) U.S. Cl.
CPC ............. *E02F 9/2207* (2013.01); *E02F 9/2217* (2013.01); *E02F 9/2296* (2013.01); *A01B 63/00* (2013.01); *E02F 9/26* (2013.01)
USPC ............... 700/282; 700/17; 700/275; 700/46; 700/83

(58) Field of Classification Search
None
See application file for complete search history.

(56) References Cited

U.S. PATENT DOCUMENTS

| | | | | |
|---|---|---|---|---|
| 2,833,116 | A | * | 5/1958 | Rush ................................ 60/484 |
| 4,343,060 | A | * | 8/1982 | Hildebrand et al. .............. 15/84 |
| 4,518,043 | A | * | 5/1985 | Anderson et al. ................. 172/6 |
| 5,267,440 | A | * | 12/1993 | Nakamura et al. .............. 60/426 |
| 5,590,731 | A | * | 1/1997 | Jacobson ..................... 180/53.4 |
| 5,887,669 | A | * | 3/1999 | Ostler et al. ................. 180/53.4 |
| 5,957,213 | A | * | 9/1999 | Loraas et al. ..................... 172/2 |
| 6,061,617 | A | * | 5/2000 | Berger et al. ................... 701/50 |
| 6,062,331 | A | * | 5/2000 | Grunow et al. ............... 180/268 |
| 6,112,839 | A | * | 9/2000 | Ostler et al. ................. 180/53.4 |
| 6,202,014 | B1 | * | 3/2001 | Brandt et al. ................... 701/50 |

(Continued)

OTHER PUBLICATIONS

Background Information (1 page) (admitted as prior art before Jun. 8, 2007).

(Continued)

*Primary Examiner* — Kavita Padmanabhan
*Assistant Examiner* — Christopher E Everett
(74) *Attorney, Agent, or Firm* — Faegre Baker Daniels LLP

(57) ABSTRACT

A work machine (10) comprises an operator interface (30), an auxiliary electro-hydraulic circuit (22 or 322) adapted to operate a hydraulic actuator (16) of an auxiliary tool (12) when the auxiliary tool (12) is attached to the work machine (10), and a controller unit (24) that communicates with the operator interface (30) and the auxiliary electro-hydraulic circuit (22 or 322). The controller unit (24) is adapted to receive from the operator interface (30) an electrical setpoint signal representative of a flow setpoint selected by an operator via the operator interface (30), and electrically operate the auxiliary electro-hydraulic circuit (22 or 322) so as to output flow from the auxiliary electro-hydraulic circuit (22 or 322) to the auxiliary tool (12) at a substantially constant magnitude represented by the flow setpoint. An associated method is disclosed.

20 Claims, 13 Drawing Sheets

(56) References Cited

U.S. PATENT DOCUMENTS

| | | | |
|---|---|---|---|
| 6,314,727 B1 * | 11/2001 | Prabhu et al. | 60/431 |
| 6,551,073 B1 * | 4/2003 | O'Sullivan | 417/234 |
| 6,609,369 B2 * | 8/2003 | Koehler et al. | 60/459 |
| 6,725,131 B2 * | 4/2004 | Lunzman | 700/282 |
| 6,923,285 B1 * | 8/2005 | Rossow et al. | 180/272 |
| 7,481,052 B2 * | 1/2009 | Mauch et al. | 60/422 |
| 7,756,623 B2 * | 7/2010 | Jarrett et al. | 701/50 |
| 2003/0121257 A1 * | 7/2003 | Skinner | 60/431 |
| 2005/0102866 A1 * | 5/2005 | Sewell et al. | 37/411 |
| 2006/0229787 A1 * | 10/2006 | Kurup et al. | 701/50 |
| 2007/0041849 A1 * | 2/2007 | Allen | 417/273 |
| 2009/0171482 A1 * | 7/2009 | Mindeman et al. | 700/83 |

OTHER PUBLICATIONS

Notification of Transmittal of the International Search Report and the Written Opinion of the International Searching Authority, or the Declaration; the International Search Report; and the Written Opinion of the International Searching Authority (8 pages) (Jan. 28, 2008) for PCT/US2007/13615.

* cited by examiner

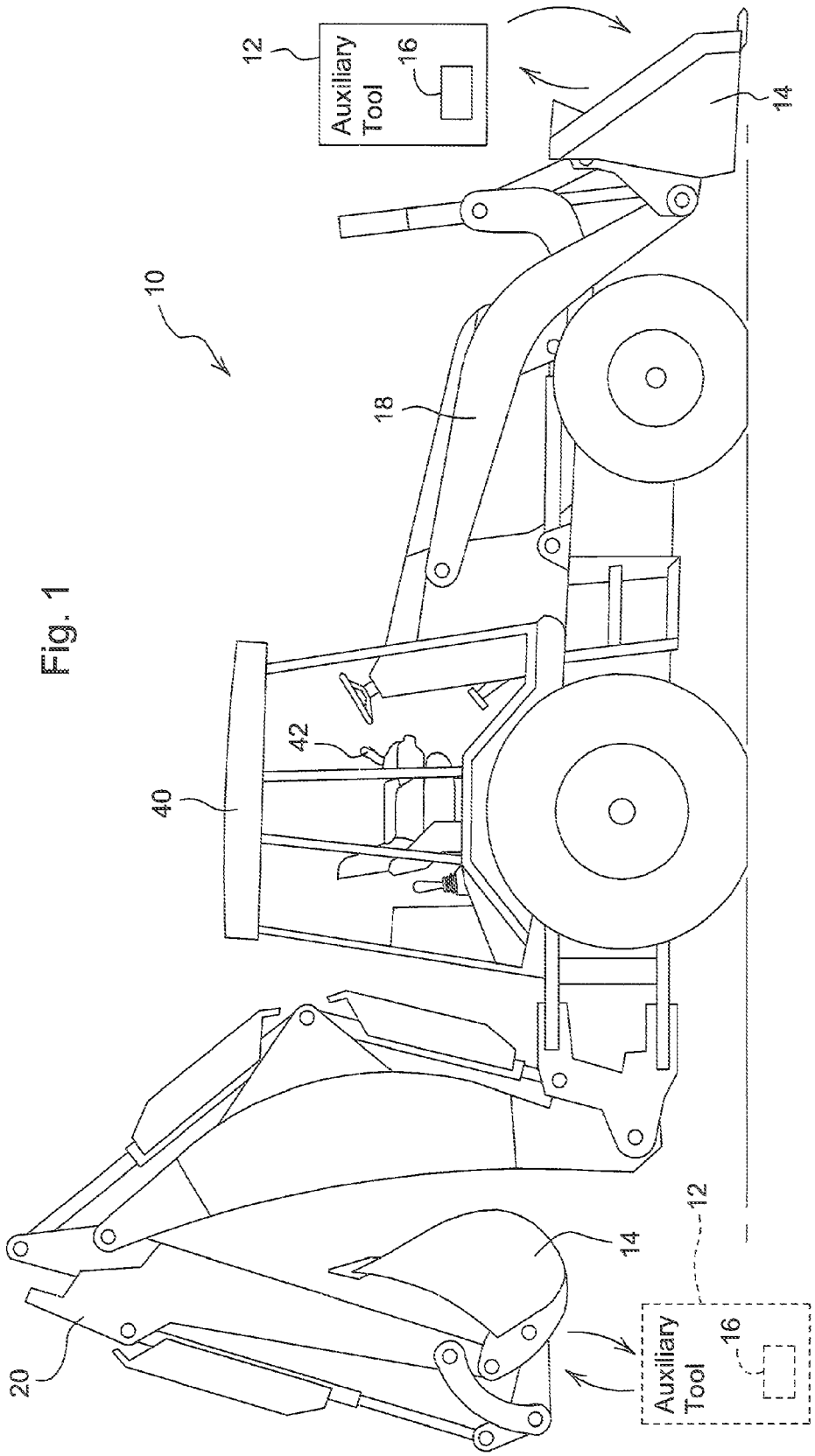

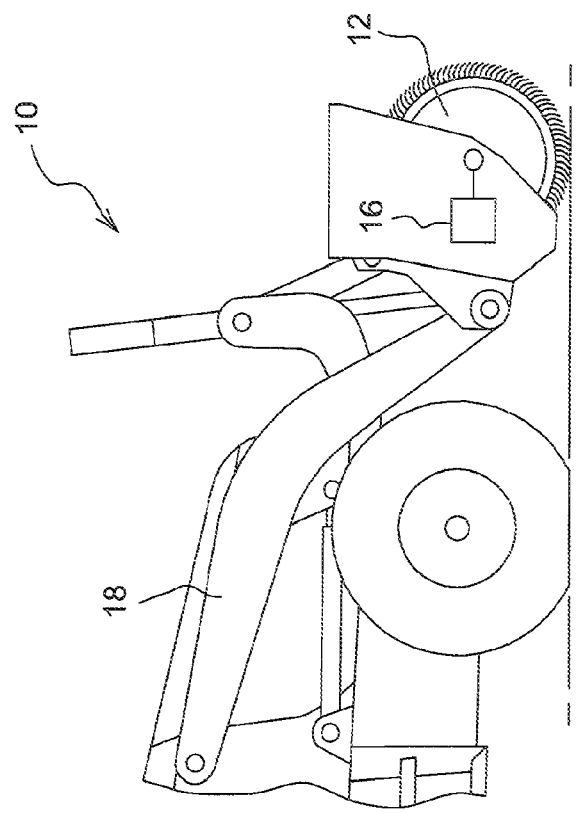
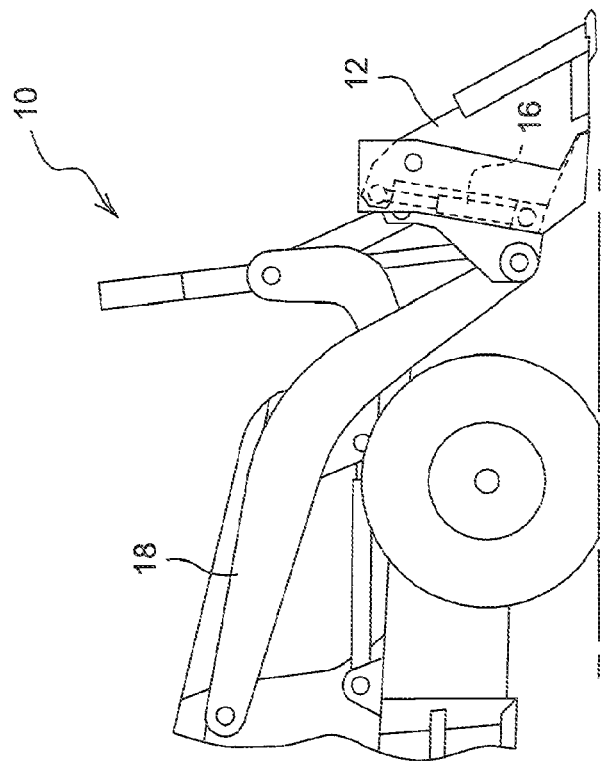

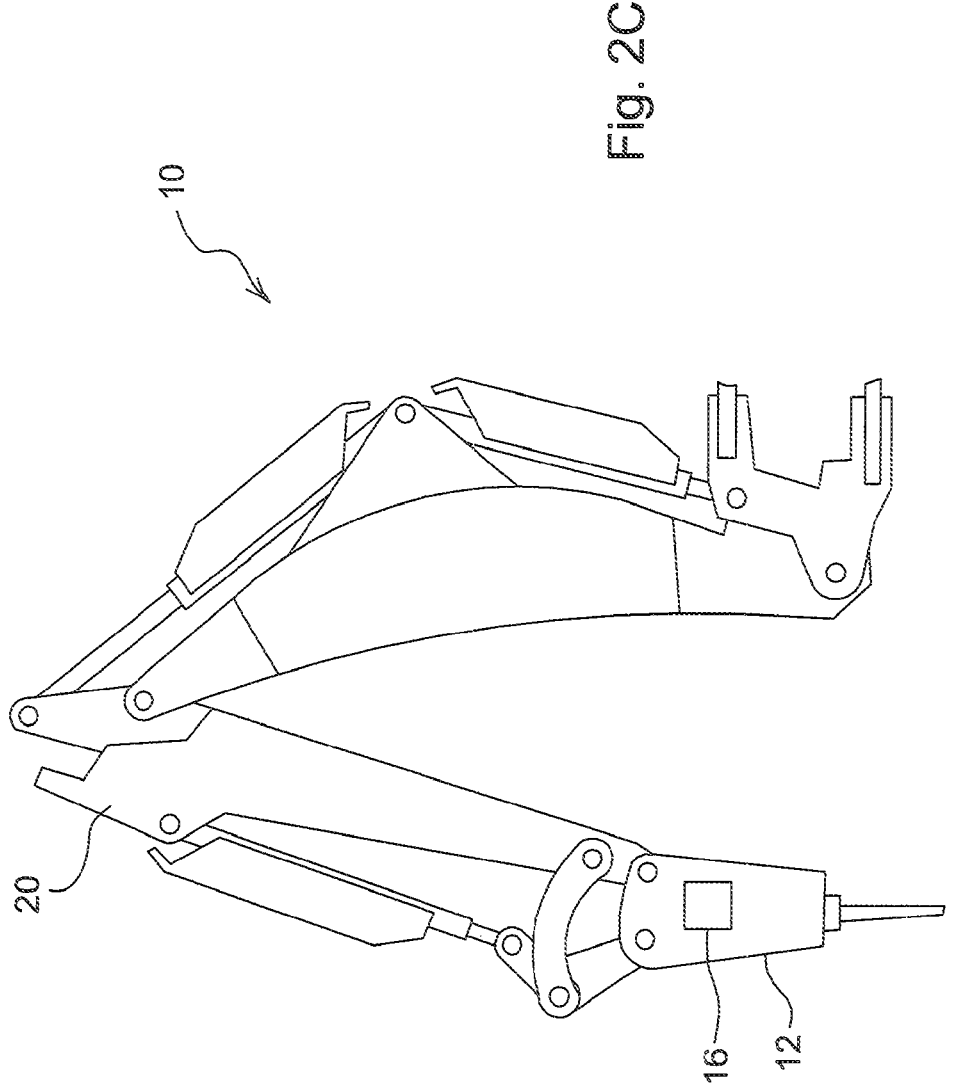

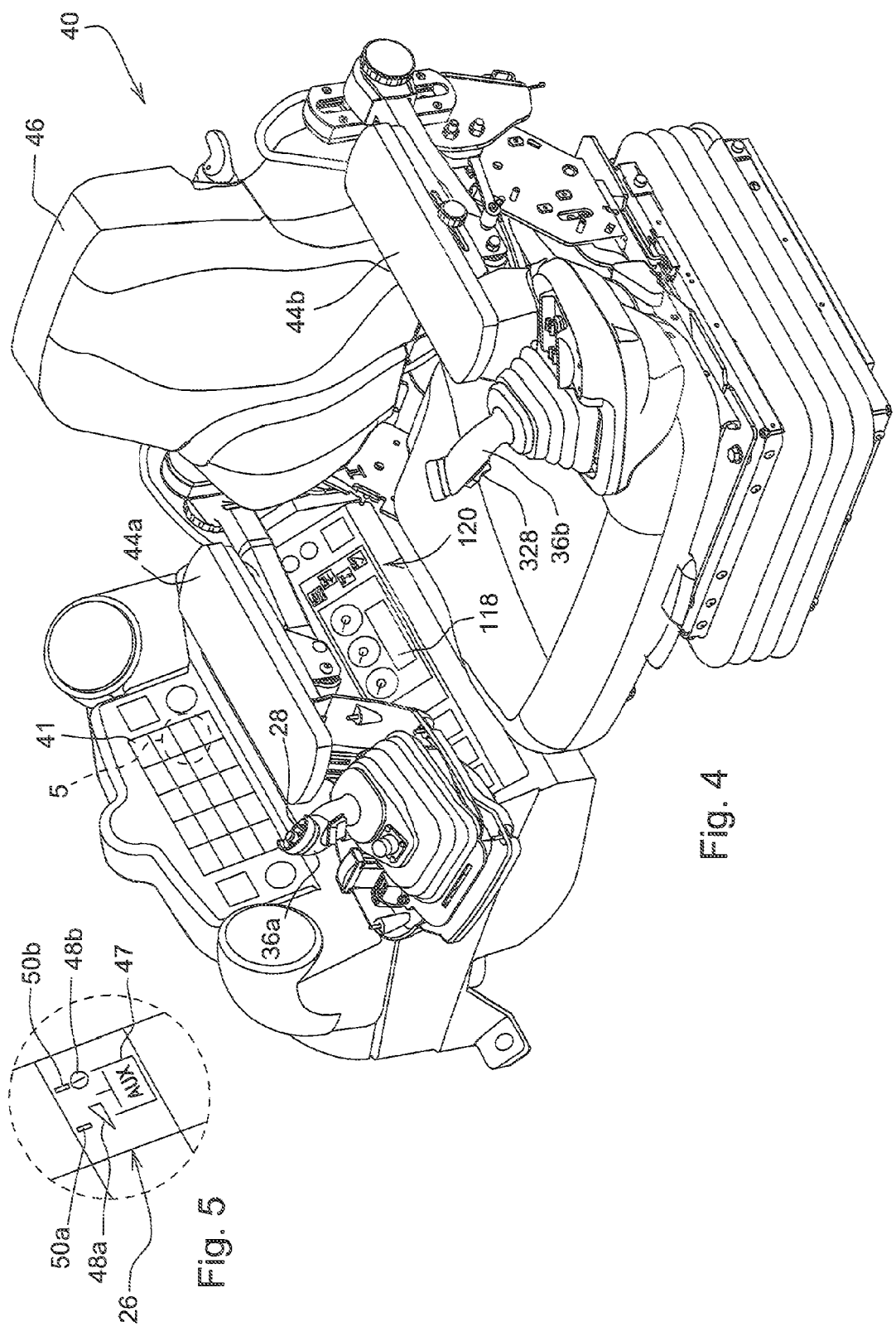

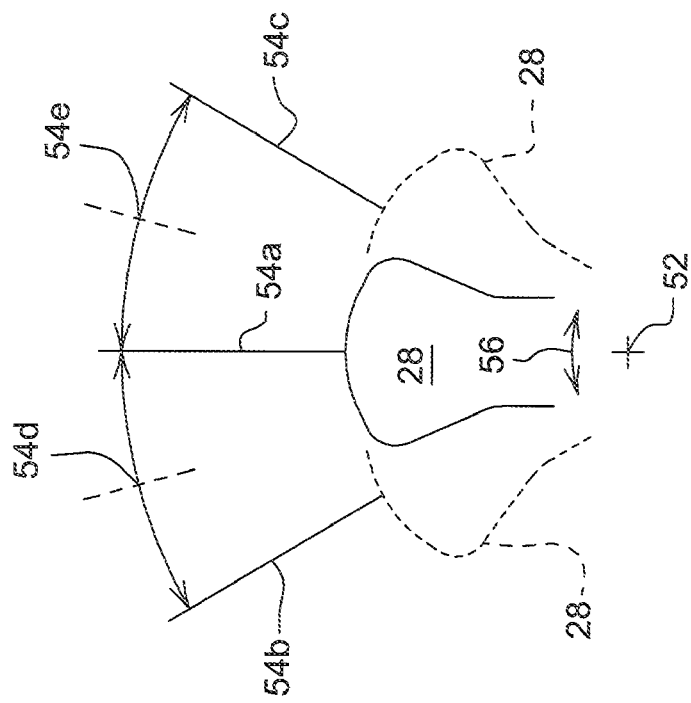
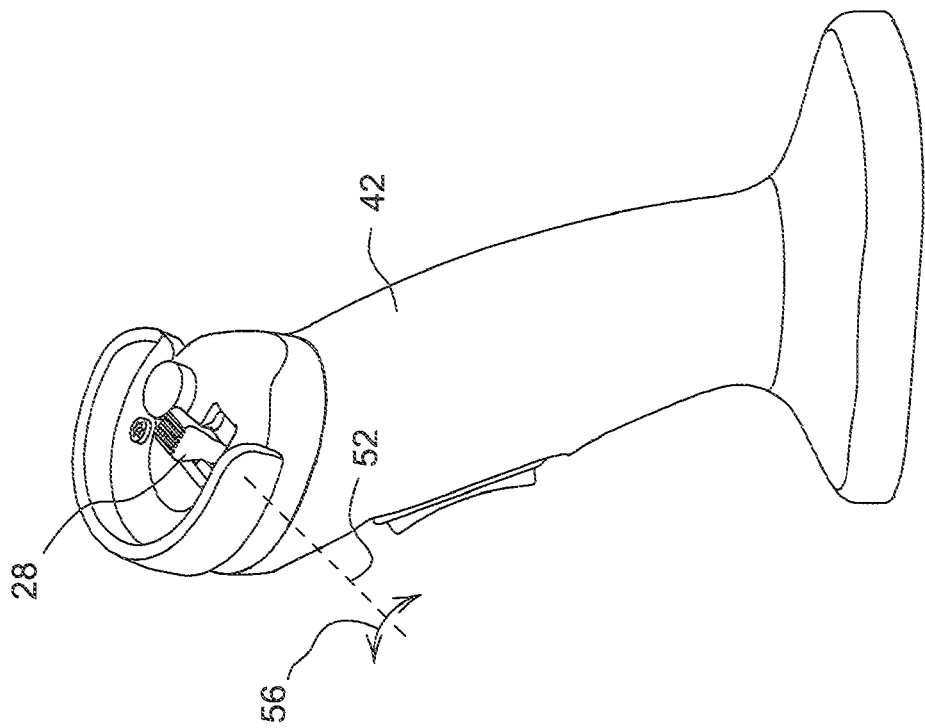

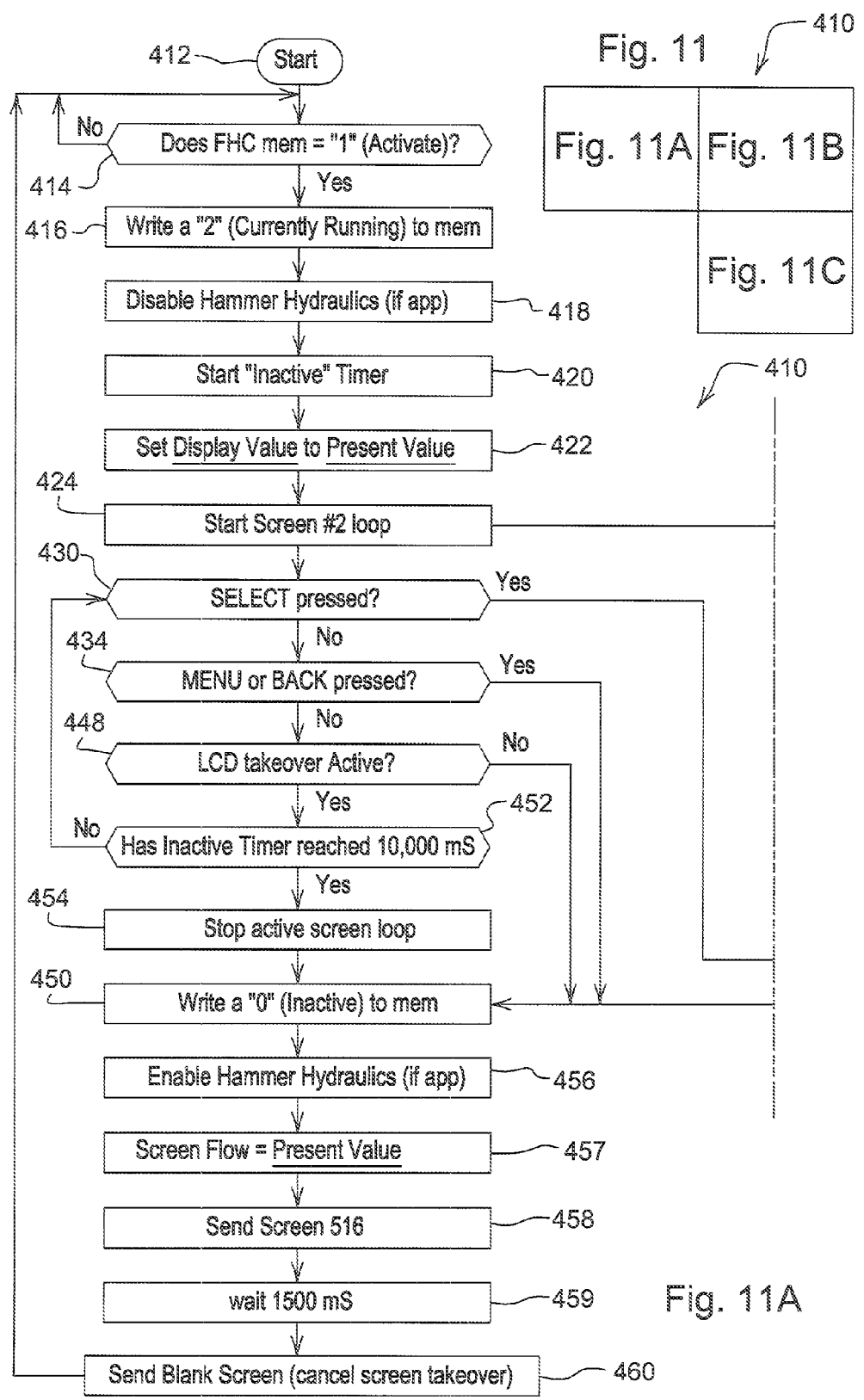

US 8,862,274 B2

ELECTRO-HYDRAULIC AUXILIARY CONTROL WITH OPERATOR-SELECTABLE FLOW SETPOINT

FIELD OF THE DISCLOSURE

The present disclosure relates to control of a flow setpoint for operation of an auxiliary tool attached to a work machine.

BACKGROUND OF THE DISCLOSURE

There are work machines (e.g., construction, agricultural, forestry) which can operate the hydraulic actuator(s) of an auxiliary tool attached to the work machine. Auxiliary tools are commonly referred to as an auxiliary attachment, or just attachment. Examples of such an auxiliary tool include a multi-function bucket ("clamshell bucket"), thumb for a bucket, rotary broom, auger, hammer, vibratory compactor, rotary wrist, snow blower, grapple, shear felling head, and disk saw felling head, to name just a few.

As indicated, the auxiliary tool has its own hydraulic actuator(s) onboard the auxiliary tool. Such a hydraulic actuator may be, for example, a hydraulic cylinder that provides a linear output, as for a clamshell bucket, and/or a hydraulic motor that provides a rotary output, as for a broom or hammer.

SUMMARY OF THE DISCLOSURE

According to the present disclosure, there is provided a work machine comprising an operator interface, an auxiliary electro-hydraulic circuit adapted to operate a hydraulic actuator of an auxiliary tool when the auxiliary tool is attached to the work machine, and a controller unit that communicates with the operator interface and the auxiliary electro-hydraulic circuit. The controller unit is adapted to receive from the operator interface an electrical setpoint signal representative of a flow setpoint selected by an operator via the operator interface, and electrically operate the auxiliary electro-hydraulic circuit so as to output flow from the auxiliary electro-hydraulic circuit to the auxiliary tool at a substantially constant magnitude represented by the flow setpoint. An associated method is disclosed.

As such, the operator can electrically select a flow setpoint and thus the flow (i.e., the flow rate) for the auxiliary tool, in order to operate the auxiliary tool in a continuous manner at a substantially constant speed. Moreover, the operator interface may be located in the operator's station for the operator to readily select the flow setpoint.

The above and other features will become apparent from the following description and the attached drawings.

BRIEF DESCRIPTION OF THE DRAWINGS

The detailed description of the drawings refers to the accompanying figures in which:

FIG. 1 is side elevation view of a work machine, in the form of, for example, a backhoe loader;

FIG. 2A is a side elevation view showing an exemplary first auxiliary tool in the form of a clamshell bucket attached to the work machine;

FIG. 2B is a side elevation view showing an exemplary second auxiliary tool in the form of a rotary broom attached to the work machine;

FIG. 2C is a side elevation view showing an exemplary third auxiliary tool in the form of a hammer attached to the work machine;

FIG. 4 is a perspective view of the interior of an exemplarily operator's station for the work machine;

FIG. 5 is an enlarged perspective view of region 5 of FIG. 4 showing an exemplary auxiliary mode selector for an operator to select between a proportional mode or a continuous mode;

FIG. 6 is an enlarged side elevation view of an exemplary joystick with an auxiliary input device (e.g., a thumb-actuated paddle) on top of the joystick for an operator to command operation of the auxiliary electro-hydraulic circuit and, in turn, the auxiliary tool;

FIG. 7 is an enlarged side elevation view of the auxiliary input device showing, in solid, the auxiliary input device in its neutral position and, in phantom, the auxiliary input device in its maximum forward and maximum reverse positions;

FIG. 11 is diagrammatic view showing the relationship between FIGS. 11A-11C;

FIGS. 11A-11C show portions of a control scheme for an operator to select a flow setpoint via the operator interface.

DESCRIPTION OF THE DRAWINGS

Figure 3:
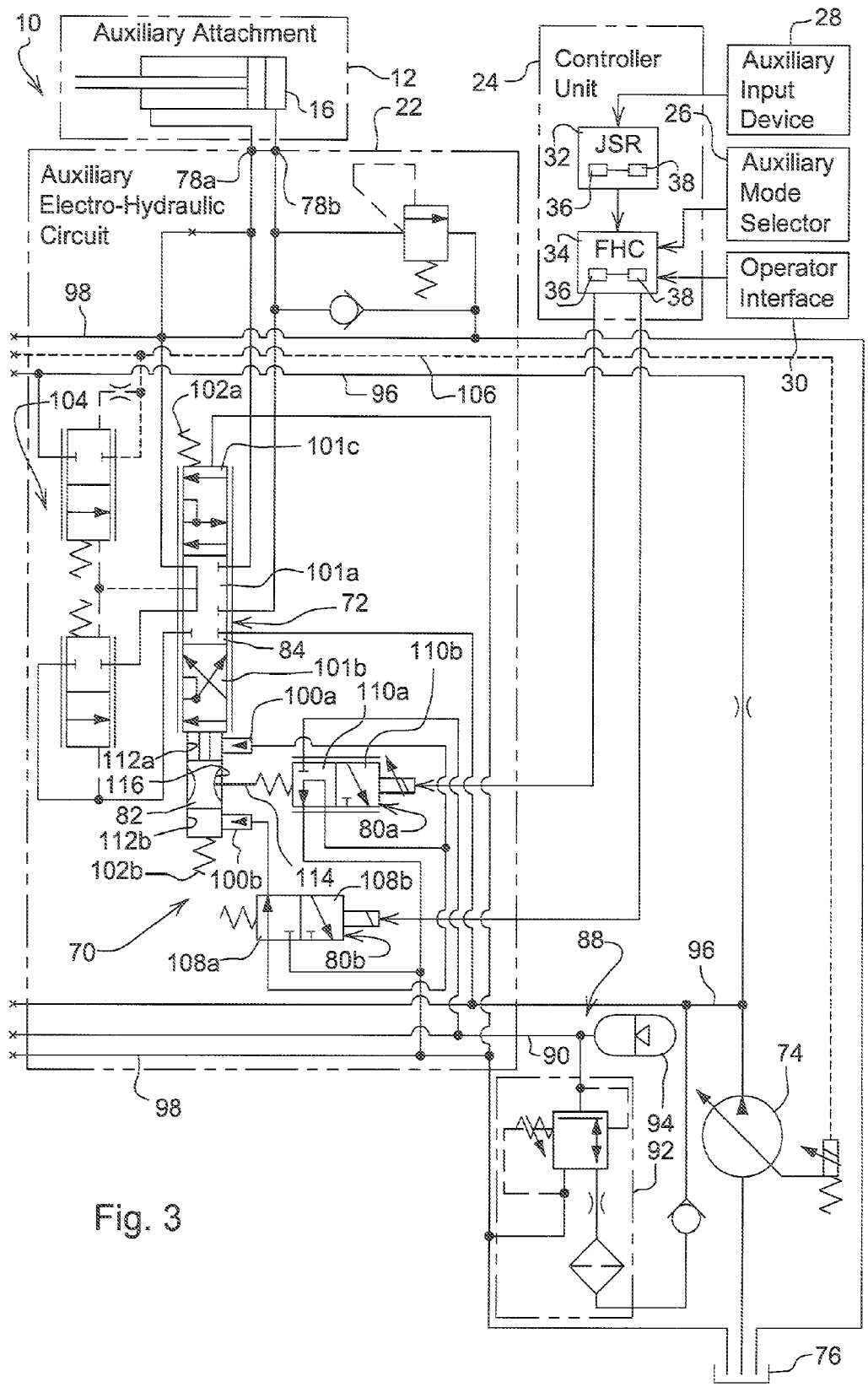
FIG. 3 is a diagrammatic view of an auxiliary electro-hydraulic circuit under the control of a controller unit for operation of an auxiliary tool (note that, although the auxiliary tool is shown to have a hydraulic cylinder as a hydraulic actuator, the hydraulic actuator may take some other form such as, for example, a hydraulic motor)

Referring to FIG. 1, there is shown a work machine 10 to which an auxiliary tool 12 may be attached in place of a main tool 14. Unlike the main tool 14, the auxiliary tool 12 has its own hydraulic actuator(s) 16 onboard the auxiliary tool 12. Although the work machine is exemplarily illustrated as a backhoe loader with a loader portion 18, which may have a loader bucket as a main tool 14, and a backhoe portion 20, which may have an excavator bucket as a main tool 14, the work machine 10 may be any type of work machine, such as, for example, a construction, agricultural, or forestry machine, to name just a few. Further, as shown in FIG. 1, in the exemplary case of a backhoe loader, the loader portion 18 and/or the backhoe portion 20 may be equipped with an auxiliary tool 12.

Referring to FIGS. 2A-2C, the auxiliary tool 12 may be any of a wide variety of auxiliary tools (e.g., clamshell bucket, thumb for a bucket, rotary broom, auger, hammer, vibratory compactor, rotary wrist, snow blower, grapple, shear felling head, disk saw felling head, to name just a few). Illustratively, in FIG. 2A, the auxiliary tool 12 is, for example, a clamshell bucket which is attached to the loader portion 18 and has a pair of onboard hydraulic cylinders as its hydraulic actuators 16 for moving a movable jaw relative to a fixed jaw. In FIG. 2B, the auxiliary tool 12 is, for example, a rotary broom which is attached to the loader portion 18 and has an onboard hydraulic motor as its hydraulic actuator for rotating the broom. In FIG. 2C, the auxiliary tool 12 is, for example, a hammer which is attached to the backhoe portion 20 and also has an onboard hydraulic motor as its hydraulic actuator.

Referring to FIG. 3, various components of the work machine 10 for operating the auxiliary tool 12 are shown. An auxiliary electro-hydraulic circuit 22 provides flow of hydraulic fluid to the hydraulic actuator(s) 16 of the tool 12 for operation of the tool 12 when the tool 12 is attached to the machine 10 (it is to be understood that the actuator 16 is shown as a hydraulic cylinder for illustrative purposes only, and not by way of limitation). In the backhoe loader example, there may be a circuit 22 for the loader portion 18 and another circuit 22 for the backhoe portion 22, each for operating a respective auxiliary tool 12. The auxiliary electro-hydraulic circuit 22 (e.g., one or both circuits 22 of a backhoe loader) may be under the control of a controller unit 24 which receives inputs from an auxiliary mode selector 26, an auxiliary input device 28, and, in some embodiments, an operator interface 30, as discussed in more detail below.

The controller unit 24 may be a single controller or a plurality of controllers networked for communication. Exemplarily, the controller unit 24 has a first controller 32 and a second controller 34. The first controller 32 may be, for example, a right joystick controller ("JSR" in FIG. 3) since the auxiliary input device 28 is exemplarily mounted on top of a right joystick 36a (see FIGS. 4 and 6). The second controller 34 may be, for example, referred to as a Flex Hydraulic Controller ("FHC" in FIG. 3) since it outputs control signals to the auxiliary electro-hydraulic circuit 22 and possibly other electro-hydraulic circuits onboard the machine 10.

It is to be understood that the first and second controllers 32, 34 may be any of the controllers onboard the machine 10. Moreover, as already indicated, a single controller may be used in place of the two controllers 32, 34. Hence, the term "controller unit" is used herein to mean one or more controllers. Further, the term "unit" is used herein to mean one or more of the subject component.

Along these lines, the controller unit 24 has a processor unit, comprising one or more processors, and a memory unit, comprising one or more memory devices, electrically coupled to the processor unit and having stored therein instructions which, when executed by the processor unit, causes the processor unit to perform the various functions of the controller unit 24. Similarly, in the case where the controller unit 24 has multiple controllers, at the controller level, each controller has its own processor 36a and its own memory device 38 electrically coupled to the processor 36a and having stored therein instructions which, when executed by the processor 36a, causes the processor to perform the various functions of the controller.

Referring to FIG. 4, the auxiliary mode selector 26, the auxiliary input device 28, and the operator interface 30 (when included) may be located at an operator's station 40 for access thereto by an operator at the operator's station 40. Illustratively, the auxiliary mode selector 26 is exemplarily included in a sealed switch module 41 mounted on a stationary panel at the operator's station 40. When included, the operator interface 30 may be mounted on the stationary panel as well, such as, for example, below the sealed switch module 41. Further illustratively, the joystick 36a is exemplarily mounted on a right armrest 44a on the operator's seat 46, and, as shown best in FIG. 6, the auxiliary input device 28 is exemplarily mounted on top of the right joystick 36a.

In the loader backhoe example, the operator input device 28 on the right joystick 36a is used to provide inputs for control of an auxiliary electro-hydraulic circuit 22 for the loader portion 18, and a similar operator input device (not shown) (e.g., thumb-actuated paddle) is mounted on top of a left joystick 36b mounted on a left armrest 44b of the operator's seat 46 to provide inputs for control of an auxiliary electro-hydraulic circuit 22 for the backhoe portion 20, the circuits 22 being configured as shown in FIG. 3, but dedicated to their respective portions 18, 20.

Referring to FIG. 5, the operator can operate the auxiliary mode selector 26 to select between a proportional mode and a continuous mode for operation of the auxiliary electro-hydraulic circuit 22 and, in turn, the auxiliary tool 12 in the selected mode. Which mode is selected depends on the type of auxiliary tool 12 to be operated. The auxiliary mode selector 26 is configured to toggle between the proportional mode and the continuous mode in response to successive actuation (e.g., pressing) of the auxiliary mode selector.

Illustratively, the auxiliary mode selector 26 includes auxiliary indicia 47 representing that the mode selector 26 is the component which can be operated to switch between the proportional mode and the continuous mode, proportional-mode indicia 48a representative of the proportional mode and continuous-mode indicia 48b representative of the continuous mode. The auxiliary mode selector 26 further includes two visual indicators 50a, 50b which upon selection of the respective proportional and continuous modes. Each indicator 50a, 50b is, for example, an individual light which illuminates and remains illuminated while the respective mode is the selected mode. An audible indicator (not shown) may also activate for a relatively short period of time (e.g., emit a brief audible tone) each time the mode is changed.

Referring to FIGS. 6 and 7, the auxiliary input device 28 (e.g., a thumb-actuated paddle) is the primary control for controlling operation of the auxiliary electro-hydraulic circuit 22 and thus the auxiliary tool 12 once the mode has been selected. As shown best in FIG. 7, the device 28 is exemplarily rotatable about an axis 52 away from a neutral position 54a in forward and reverse directions toward maximum forward and maximum reverse positions 54b, 54c as indicated by double-headed arrow 56. The purpose for such movement is discussed in more detail below.

Figure 8:
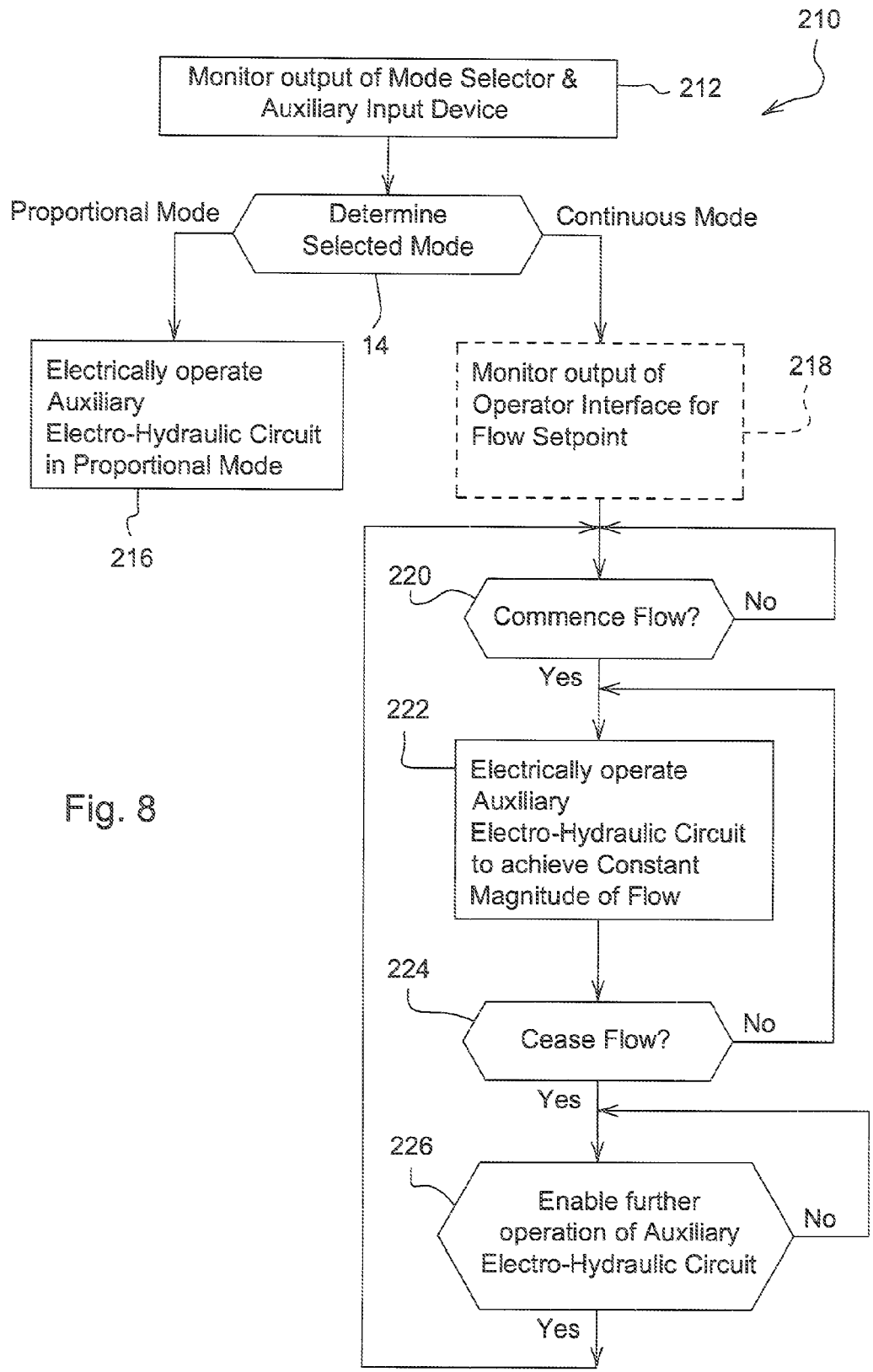
FIG. 8 is a control scheme for selective operation of the auxiliary electro-hydraulic circuit in the proportional mode or the continuous mode.

Referring back to FIG. 3 and also to FIG. 8, operation of the overall system is now discussed. A control scheme 210 (FIG. 3) may be implemented by the controller unit 24 to control operation of the auxiliary electro-hydraulic circuit 22 and, in turn, the auxiliary tool 12. The control scheme 210 is programmed into the controller unit 24 to selectively operate the circuit 22 in the proportional mode and the continuous mode. In the loader backhoe example, in some embodiments, both circuits 22, dedicated respectively to the loader portion 18 and the backhoe portion 20, may be operated selectively in the proportional and continuous modes by the controller unit 24, whereas, in other embodiments, only one of the circuits 22 (e.g., the circuit 22 for the loader portion 18) may be operated selectively in the proportional and continuous modes by the controller unit 24 while the other of the circuits 22 (e.g., the circuit 22 for the backhoe portion 18) may be operable in the proportional mode, but not the continuous mode, by the controller unit 24. The following description discusses the example in which a circuit 22 is selectively operable in both the proportional and continuous modes, it being understood that such description may apply to a possible second (or more) circuit 22 onboard the machine 10 inasmuch as the controller unit 24 is configured also to operate that circuit 22 in one or both of the proportional and continuous modes.

The controller unit 24 communicates with the auxiliary input device 28, the auxiliary mode selector 26, the operator interface 30 (when included), and the auxiliary electro-hydraulic circuit 22. In act 212, the FHC 34 monitors output of the mode selector 26 and receives therefrom a selected-mode signal representative of the selected mode, i.e., the proportional mode or the continuous mode.

The JSR 32 also monitors output of the auxiliary input device 28 and receives therefrom at least one control signal (i.e., one or more control signals). The at least one control signal is representative of the displacement of the auxiliary input device 28, such as, for example, displacement in either the forward or reverse directions relative to the neutral position. The at least one control signal may also be representative of the direction of displacement of the auxiliary input device 28 (e.g., forward or reverse direction relative to the neutral position). The at least one control signal may be a single signal representative of both the displacement and the direction of displacement in the form of a signed displacement (e.g., +/− displacement from neutral position) or two separate signals respectively representing the displacement and the direction. In any event, in the case in which the controller unit 24 has the JSR 32 and the FHC 34, the at least one control signal may be sent from the JSR 32 to the FHC 34 via a CAN bus.

In act 214, the FHC 34 determines which of the proportional mode or the continuous mode is selected based on the selected-mode signal. The controller unit 24 then proceeds to electrically operate the auxiliary electro-hydraulic circuit 22 in the selected mode in response to operation of the auxiliary input device 28 (e.g., in response to the at least one control signal) such that, in the proportional mode, the magnitude of flow outputted from the auxiliary electro-hydraulic circuit 22 to the auxiliary tool 12 is proportional to the displacement of the auxiliary input device 28, and, in the continuous mode, the magnitude of flow outputted from the auxiliary electro-hydraulic circuit 22 to the auxiliary tool 12 is substantially constant whenever flow is outputted from the auxiliary electro-hydraulic circuit 22 to the auxiliary tool 12 in the continuous mode.

The term "continuous" as used herein refers to the substantially constant nature of the flow magnitude whenever flow is outputted from the circuit 22 (or circuit 322 discussed below) to an auxiliary tool 12. It does not mean that the flow is perpetual, as indeed the operator may turn the flow ON and OFF during the continuous mode or other form of continuous operation (e.g., the continuous operation of circuit 322 below).

Further, the term "substantially" is intended merely to account for variations in the flow magnitude that may occur in the continuous mode due to inherent system limitations (the term "system" referring here to the machine 10 plus the tool 12 and any other tools attached to the machine 10) such as, for example, system reactions to transients (e.g., load changes), manufacturing tolerances, ramp-up time to the constant magnitude at the beginning of a request for flow, ramp-down time from the constant magnitude at the end of the request for flow, and the like. The term "substantially" is not intended to account for changes in the position of the auxiliary input device 28 in the continuous mode, except the changes which may be necessary to actually start and end flow during the continuous mode. The magnitude of flow in the continuous mode is otherwise independent of the position of the auxiliary input device 28.

Thus, in the proportional mode, the auxiliary tool 12 can be operated by the auxiliary electro-hydraulic circuit 22 in a manner proportional to the displacement of the auxiliary input device 28, whereas, in the continuous mode, the auxiliary tool 12 can be operated by the auxiliary electro-hydraulic circuit 22 in a continuous manner at a substantially constant speed. Further, in both the proportional mode and the continuous mode, the direction of flow in the auxiliary electro-hydraulic circuit exemplarily corresponds to the direction of displacement of the auxiliary input device 28.

If the FHC 34 determines that the proportional mode is the selected mode, the control scheme 210 advances to act 216. If, on the other hand, it determines that the continuous mode is the selected mode, the control scheme 210 advances to either act 218 or 220.

In act 216, the FHC 34 electrically operates the auxiliary electro-hydraulic circuit 22 in the proportional mode. It does so by commanding operation of an electro-hydraulic pilot section 70 for piloting a proportional, auxiliary control valve 72. The pilot section 70 of the circuit 22 is configured as a closed-loop force-feedback section. The auxiliary control valve 72 of the circuit 22 is configured for directing flow, pressurized by a variable displacement pump 74 and supplied by a tank 76, between ports 78a and 78b of the circuit 22 fluidly coupled to the hydraulic actuator(s) 16.

The pilot section 70 of the circuit 22 has electro-hydraulic valves 80a, 80b (e.g., solenoid valves) and a pilot spool 82 mechanically connected to a valve spool 84 of the control valve 72. The valve 80a is a proportional, magnitude valve, and the valve 80b is an on/off, directional valve. To command operation of the valves 80a, 80b, the FHC 34 outputs to the magnitude valve 80a a magnitude control signal representative of the displacement of the auxiliary input device 28, and outputs to the directional valve 80b a direction control signal representative of the direction of displacement of the auxiliary input device 28.

Pilot pressure is provided to the pilot section 70 by a pilot pressure supply 88 via a pilot line 90. The pilot pressure supply 88 has a pressure reducing relieving valve 92 and an accumulator 94 that stores pilot fluid provided thereto by the valve 92 at a predetermined pilot pressure (e.g., about 600 psi).

Before going further, it is noted that the auxiliary electro-hydraulic circuit 22 may be just one of a plurality of electro-hydraulic circuits onboard the machine 10. As noted above, there may two circuits 22. Further, there may be a number of other electro-hydraulic circuits onboard. The valves of such circuits may be serviced by common components, such as, for example, the pump 74, the tank 76, the pilot supply section 88, the pilot line or rail 90, a supply line or rail 96 for supplying pressurized fluid from the pump 74 to the circuits, a return line or rail 98 for returning hydraulic fluid to the tank 76, and a load-sense line or rail 106 that communicates load-sensing information back to the pump 74. It could be that, in some embodiments, such components are dedicated solely to a single auxiliary electro-hydraulic circuit 22.

Continuing on, when both valves 80a, 80b are de-energized, the valves 80a, 80b assume the normal positions shown in FIG. 3. In these positions, pilot pressure from the pilot line 90 is blocked from communication to pilot ports 100a, 100b. As such, the valve spool 84 of the control valve 72 is positioned in its neutral position 101a by opposed springs 102a, 102b.

To move the spool 84 toward its position 101b, the FHC 34 de-energizes the direction valve 80b, but outputs a magnitude control signal, proportional to the displacement of the auxiliary input device 28. As a result, the directional valve 80b assumes its OFF position 108a, and the magnitude valve 80a moves proportionally away from its fully closed position 110a toward its fully opened position 110b. In this way, pilot pressure from the pilot line 90 is communicated through the magnitude valve 80a and the pilot port 100a to a chamber 112a at one end of the spool 82, and through the directional valve 80b and the pilot port 100b to another chamber 112b at the opposite end of the spool 82, causing the spool 82 to move proportionally upwardly in FIG. 3 (due to the unequal areas on the ends of the spool 82) so as to move the spool 84 proportionally toward its position 101b. A pin 114 rides on a cam surface 116 of the spool 82 so as to mechanically move the valve 80a back toward its fully closed position, overcoming the electro-magnetic force of the solenoid, and eventually stop movement of the spools 82, 84 when the spool 84 reaches its position 101b. Movement of the spool 84 away from its neutral position toward its position 101b directs flow of pressurized fluid from the supply line 96 to the port 78a and actuator(s) 16 and directs return flow from the port 78b and actuator(s) 16 to the return line 98.

To move the spool 84 toward its position 101c, the FHC 34 energizes both valves 80a, 80b. In particular, it outputs to the magnitude valve 80a a magnitude control signal, and outputs to the directional valve 80b a direction control signal. As a result, the directional valve 80b assumes its ON position 108b, and the magnitude valve 80a moves proportionally away from its fully closed position 110a toward its fully opened position 110b.

In this way, pilot pressure from the pilot line 90 is communicated through the magnitude valve 80a and the pilot port 100a to the chamber 112a. However, since the directional valve 80b is now in its ON position 108b, pilot pressure is blocked from communication to the port 100b and chamber 112b. Instead, the ON position 108b establishes communication between the chamber 112b and the return line 98, thereby reducing the pressure in the chamber 112. As such, the pilot pressure in the chamber 112a moves the spool 82 proportionally downwardly in FIG. 3 so as to move the spool 84 proportionally toward its position 101c. The pin 114 rides on the cam surface 116 of the spool 82 so as to mechanically move the valve 80a back toward its fully closed position, overcoming the electro-magnetic force of the solenoid, and eventually stop movement of the spools 82, 84 when the spool 84 reaches its position 101c. Movement of the spool 84 away from its neutral position toward its position 101c directs flow of pressurized fluid from the supply line 96 to the port 78b and actuator(s) 16 and directs return flow from the port 78a and actuator(s) 16 to the return line 98.

Thus, in the proportional mode, the magnitude of the flow to the actuator(s) 16 is thus proportional to the displacement of the auxiliary input device 28. Further, the direction of the flow to the actuator(s) 16 corresponds to the direction of displacement of the device 28.

An isolator compensator 104 communicates load-sensing information from the valve 72 to the load-sense line 106.

When the continuous mode is selected, the control scheme 210 advances to either act 218 or act 220, depending upon whether the machine 10 is configured to allow the operator to select a desired constant magnitude of flow, i.e., an operator-selected constant magnitude or flow setpoint (e.g., in gallons per minute), for the continuous mode via the operator interface 30. If the machine 10 is so configured, the control scheme 210 advances to act 218 for the operator to select the constant magnitude of flow. Otherwise, act 218 is omitted and the control scheme 210 advances to act 220, using a constant magnitude already stored in the memory unit of the controller unit 24 (e.g., the memory device 38 of the FHC 34).

In act 218, assuming the machine 10 is configured for the operator to select a flow setpoint representative of a desired constant magnitude of flow for the continuous mode, the operator inputs the flow setpoint into the FHC 34 via the operator interface 30. The interface 30 may have, for example, a display 118 and one or more input devices 120 for the operator to enter the operator-selected flow setpoint. The input devices 120 may be, for example, buttons, a dial, a slide, a number keypad for entering a selection, and/or the like. Regardless of how the operator actually enters the selection, the operator-selected flow setpoint is stored in the memory unit of the controller unit 24. It may be stored, for example, in the memory device 38 of the FHC 36a. The controller unit 24 then electrically operates the auxiliary electro-hydraulic circuit 22 in the continuous mode so as to output flow from the auxiliary electro-hydraulic circuit 22 to the auxiliary tool 12 at the constant magnitude represented by the flow setpoint. A control scheme 410 discussed below may be incorporated for an operator to select a flow setpoint.

In act 220, the FHC 34 determines whether to commence flow at the constant magnitude stored in the memory unit. A wide variety of flow-commencement criteria may be used by the controller unit 24 to make the determination whether to commence flow at the constant magnitude. Exemplarily, the FHC 34 triggers commencement of flow at the constant magnitude in response to a predetermined displacement of the auxiliary input device 28 from the neutral position. This predetermined displacement occurs, for example, when the input device 28 has been displaced by an amount equal to at least 50% of its travel range away from the neutral position in the forward direction or the reverse direction, i.e., position 54d or 54e, respectively (see FIG. 7). A different percentage or other commencement criteria may be used instead to initiate commencement of flow at the constant magnitude, although this criteria is considered to be particularly useful to an operator since it relates to displacement of the auxiliary input device 28 in the direction desired.

If the flow-commencement criteria has not been met, the control scheme 210 remains in act 220, continuing to check if the flow-commencement criteria has been satisfied. If the flow-commencement criteria has been met, the control scheme 210 advances to act 222.

In act 222, the controller unit 24 electrically operates the auxiliary electro-hydraulic circuit 22 so as to cause the circuit 22 to output the constant magnitude of flow to the actuator(s) 16 of the tool 12 in the direction corresponding to the direction of displacement of the auxiliary input device 28. As discussed above, this constant magnitude may have been selected by the operator. In other examples, the constant magnitude may have already been previously stored in the memory unit of the controller unit 24, such as at the factory at the time of manufacture. Exemplarily, such a pre-set constant magnitude for the continuous mode may be 100% of the available flow.

In the continuous mode, the FHC 34 outputs electrical control signals to the magnitude and directional valves 80a, 80b to cause the auxiliary electro-hydraulic circuit 22 to output the constant magnitude of flow in the desired direction. When the auxiliary input device 28 has been displaced in the forward direction by the first predetermined displacement (e.g., 50% of the travel range in the forward direction), the FHC 34 de-energizes the direction valve 80b, but outputs a magnitude control signal corresponding to the constant magnitude of flow stored in memory. As a result, the directional valve 80b assumes its OFF position 108a, and the magnitude valve 80a moves away from its fully closed position 110a toward its fully opened position 110b to the position corresponding to the constant magnitude. Pilot pressure is routed accordingly causing the pilot spool 82 to move upwardly in FIG. 3 (due to the unequal areas on the ends of the spool 82) so as to move the valve spool 84 toward position 101b to the position corresponding to the constant magnitude. When the spool 84 reaches this position, flow of pressurized fluid advances at the constant magnitude from the supply line 96 to the port 78a and actuator(s) 16 at the constant magnitude and return flow is routed from the port 78*b* and actuator(s) 16 to the return line 98. The magnitude control signal is maintained at the same level so that the spool 84 is maintained in the same position, resulting in the constant magnitude of flow.

When the auxiliary input device 28 has been displaced in the reverse direction by the predetermined displacement (e.g., 50% of the travel range in the reverse direction), the FHC 34 energizes both valves 80*a*, 80*b*. In particular, it outputs to the magnitude valve 80*a* a magnitude control signal, and outputs to the directional valve 80*b* a direction control signal. As a result, the directional valve 80*b* assumes its ON position 108*b*, and the magnitude valve 80*a* moves away from its fully closed position 110*a* toward its fully opened position 110*b* to the position corresponding to the constant magnitude. Pilot pressure is routed accordingly causing the pilot spool 82 to move downwardly in FIG. 3 so as to move the valve spool 84 toward position 101*c* to the position corresponding to the constant magnitude. When the spool 84 reaches this position, flow of pressurized fluid advances at the constant magnitude from the supply line 96 to the port 78*b* and actuator(s) 16 at the constant magnitude and return flow is routed from the port 78*a* and actuator(s) 16 to the return line 98. The magnitude control signal is maintained at the same level so that the spool 84 is maintained in the same position, resulting in the constant magnitude of flow.

In an example, the operator-selected or pre-set constant magnitude (i.e., predetermined constant magnitude) may be 100% of the available flow. In such a case, the magnitude control signal causes the magnitude valve 80*a* to move to its fully opened position which, in turn, causes the pilot spool 82 to move the valve spool 84 to one of its extreme positions 101*b* or 101*c*, depending upon the direction of displacement of the auxiliary input device 28. Moreover, the magnitude control signal causes the spool 84 to remain in that position, so as to produce the constant magnitude of flow, which, in this particular example, would be the maximum constant magnitude.

In act 224, the FHC 34 determines whether to cease flow at the constant magnitude in accordance with predetermined flow-cessation criteria. If this criteria is met, the control scheme 210 advances to act 226. If it is not met, the control scheme 210 continues to operate the circuit 22 and thus the auxiliary tool 12 at the constant magnitude in act 222.

Exemplarily, the controller unit 24 will cease flow at the constant magnitude in response to a second predetermined displacement of the auxiliary input device 28 relative to the neutral position in a direction opposite to the direction of the first predetermined displacement. It may be, for example, at least 50% of the travel range in the opposite direction, i.e., position 54*d* or 54*e*, respectively (see FIG. 7).

In an example, the constant magnitude of flow may be commanded in the forward direction by displacement of the auxiliary input device 28 at least 50% of the travel range in the forward direction to position 54*d* or beyond. Afterwards, the constant magnitude of flow may be commanded to cease by displacement of the auxiliary input device 28 at least 50% of the travel range in the reverse direction to position 54*e* or beyond. Similarly, the constant magnitude of flow may be commanded in the reverse direction by displacement of the auxiliary input device 28 at least 50% of the travel range in the reverse direction to position 54*e* or beyond, after which the constant magnitude of flow may be commanded to cease by displacement of the auxiliary input device 28 at least 50% of the travel range in the forward direction to position 54*d* or beyond. As such, the first and second predetermined displacements may be equal to one another in magnitude, but opposite in opposite direction.

In act 226, after cessation of flow in the continuous mode, the FHC 34 determines whether to enable further operation of the auxiliary electro-hydraulic circuit 22 in accordance with flow-enabling criteria. If the flow-enabling criteria is met, the control scheme 210 advances back to act 220. If it is not met, the control scheme 210 may remain at act 226. Exemplarily, the controller unit 24 enables further operation of the auxiliary electro-hydraulic circuit 22 upon return of the auxiliary input device 28 to the neutral position. Once the device 28 is returned to its neutral position, the operator can again activate the circuit 22 and thus the tool 12. Otherwise, the circuit 22 and tool 12 remain deactivated.

The FHC 34 may be configured so as to store the selected mode in the memory unit (e.g., the memory device 38 of the FHC 34) upon shut-down of the work machine 10. As such, the selected mode is stored as the default mode for the next power-up of the work machine 10.

Figure 9:
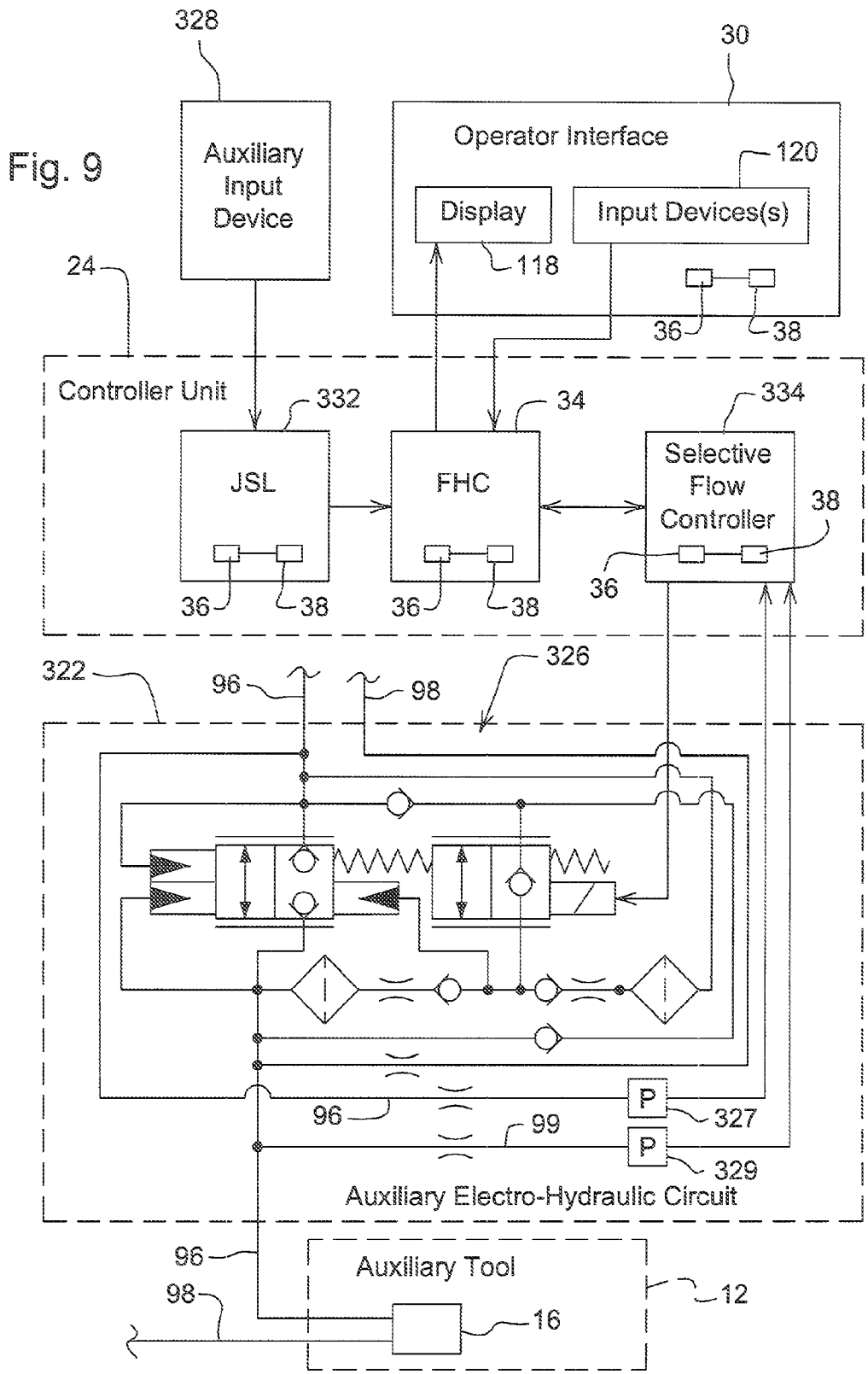
FIG. 9 is a diagrammatic view showing another auxiliary electro-hydraulic circuit under the control of the controller unit for operation of an auxiliary tool.

Referring to FIG. 9, there is shown another auxiliary electro-hydraulic circuit 322, which may be used on the work machine 10 to operate an auxiliary tool 12 in a continuous manner (i.e., at a substantially constant magnitude of flow) at a constant speed. Exemplarily, the circuit 322 has an electro-hydraulic valve 326 (a "selective flow control valve") for outputting a substantially constant magnitude of flow in one direction to the tool 12 to achieve the constant speed. The operator may select a flow setpoint via the operator interface 30 to set the constant magnitude of flow to a desired constant magnitude of flow to obtain a desired constant speed.

The circuit 322 may be included onboard the machine 10 in addition to, or in place of, the circuit(s) 22. Exemplarily, in the loader backhoe example, the circuit 322 is included onboard the machine 10 in addition to two circuits 22. As alluded to above, one of the circuits 22 may be dedicated to the loader portion 18 and selectively operable in both proportional and continuous modes by the controller unit 24, and the other circuit 22 may be dedicated to the backhoe portion 20 but operable by the controller unit 24 in only the proportional mode.

The circuit 322 may be added to the backhoe portion 20 to provide continuous operation of an auxiliary tool 12 (i.e., substantially constant magnitude of flow to the tool 12). In particular, the circuit 22 for the backhoe portion 20 may be used to provide only proportional operation of auxiliary tools that lend themselves to proportional operation (such tools being well known to those of ordinary skill in the art), whereas the circuit 322 for the backhoe portion 20 may be used to provide only continuous operation of auxiliary tools that lends themselves to continuous operation (such tools being well known to those of ordinary skill in the art). Further, two auxiliary tools 12 may be attached to the backhoe portion 20, one proportionally operable by the circuit 22 and the other continuously operable by the circuit 322. For example, a hammer and a rotary wrist for rotating the hammer to reposition the hammer may be attached to the backhoe portion 20. In such a case, the hammer would be operable by the circuit 322 for continuous operation thereby, and the rotary wrist would be operable by the circuit 22 for proportional operation thereby.

The controller unit 24 communicates with the operator interface 30 and the auxiliary electro-hydraulic circuit 322. Generally, the controller unit 24 receives from the operator interface 30 an electrical setpoint signal representative of a flow setpoint selected by an operator via the operator interface 30, and electrically operates the auxiliary electro-hydraulic circuit 322 so as to output flow from the auxiliary electro-hydraulic circuit 322 to the auxiliary tool 12 at a substantially constant magnitude represented by the flow setpoint.

The controller unit 24 further communicates with another auxiliary input device 328 (see also FIG. 4). The auxiliary input device 328 is provided for activating and deactivating the tool 12 under the control of the circuit 322 in an ON/OFF manner. The device 328 may be, for example, a 3-position rocker switch having a central maintain-OFF position for deactivating the tool 12 in an ongoing manner, a momentary-ON position to one side of the central maintain-OFF position for momentarily activating the tool 12, and a maintain-ON position to the other side of the central maintain-OFF position for activating the tool 12 in an ongoing manner. Exemplarily, a third or left joystick controller 332 ("JSL") of the controller unit 24 monitors the output of the device 328 for a request for activation or deactivation of the circuit 322 and thus the tool 12. This request is sent to, for example, the FHC 34 over a communication link (e.g., a first CAN bus).

As alluded to above, the operator interface 30 is provided to allow the operator to select a desired flow setpoint representative of a desired constant magnitude of flow to be outputted by the circuit 322 to the actuator 16 (e.g., hydraulic motor) of the tool 12 for operation of the tool 12 at a constant speed. Such operation of the operator interface 30 is discussed in more detail below in connection with FIGS. 10 and 11.

Exemplarily, the FHC 34 receives the operator-selected flow setpoint in the form of an electrical setpoint signal, and sends a corresponding flow setpoint signal (e.g., representing a percentage of maximum possible flow setpoint) to a fourth or selective flow controller 334 of the controller unit 24 over a communication link (e.g., a second CAN bus) to command the controller 334 to electrically operate a solenoid of the valve 326 to obtain the flow setpoint. Pressure sensors 327, 329 sense the pressure in supply and tool work port lines 96, 99, respectively. The controller 334 monitors output of these sensors 327, 329, determines the pressure difference therebetween, and modulates the valve 326 in response to the pressure difference so as to obtain the flow setpoint commanded by the FHC 34 via the flow setpoint signal therefrom, thereby accounting for pressure variations in the overall hydraulic system. To reiterate, it is to be understood that the controller unit 24 may be a single controller, or any number of controllers, that performs all the functions of the controllers mentioned herein (i.e., JSR 32, FHC 34, JSL 332, selective flow controller 334) as well as possibly other controllers.

Now the operator interface 30 and an associated control scheme 410 for an operator to select the flow setpoint via the interface 30 will be discussed.

Figure 10:
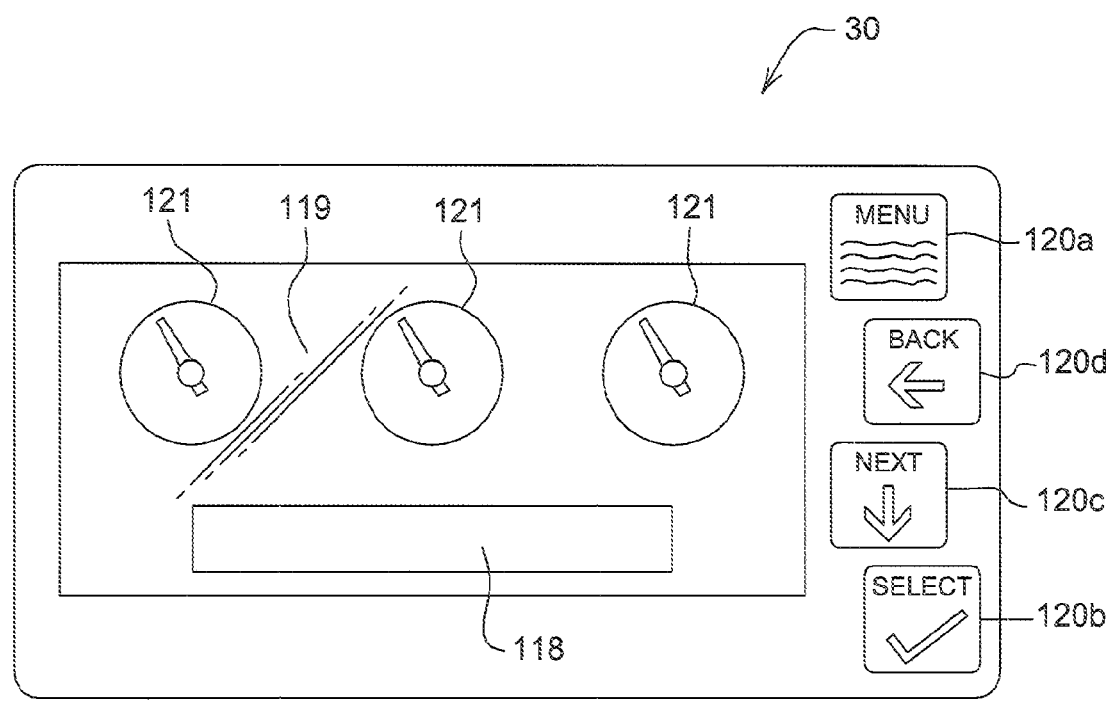
FIG. 10 is an elevation view of an operator interface located at the operator's station.

Referring to FIG. 10, the operator interface 30 has a display 118 behind a transparent protective pane 119 and a number of operator input devices, such as, for example, operator input devices 120a, 120b, 120c, 120d (e.g., pushbuttons). The display 118 may be, for example, a liquid crystal display (LCD) or other suitable display. The FHC 34 monitors output of the devices 120a, 120b, 120c, 120d, as discussed in more detail below. Gauges 121 may also be located behind the protective pane 119.

Figure 11B:
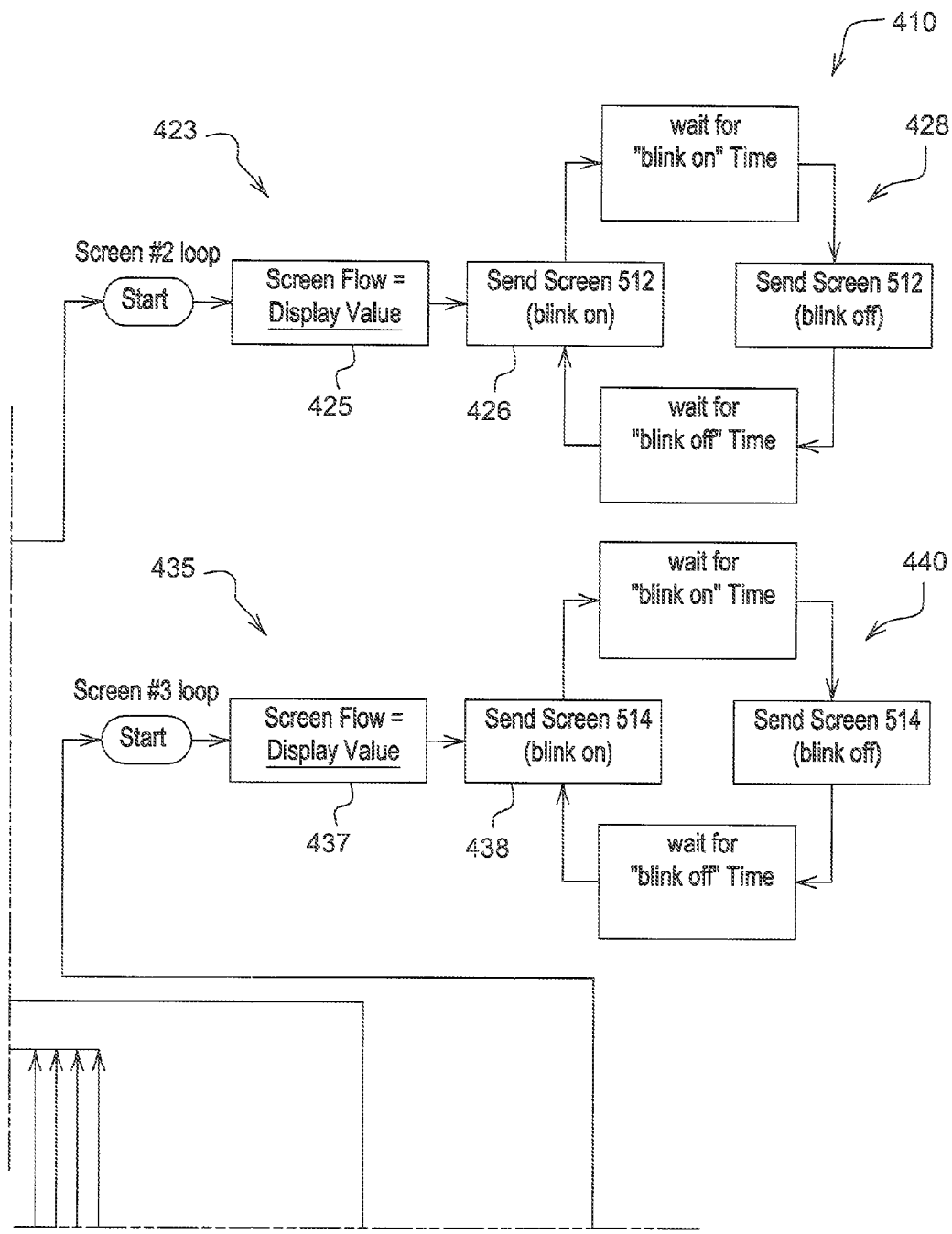
Figure 11C:
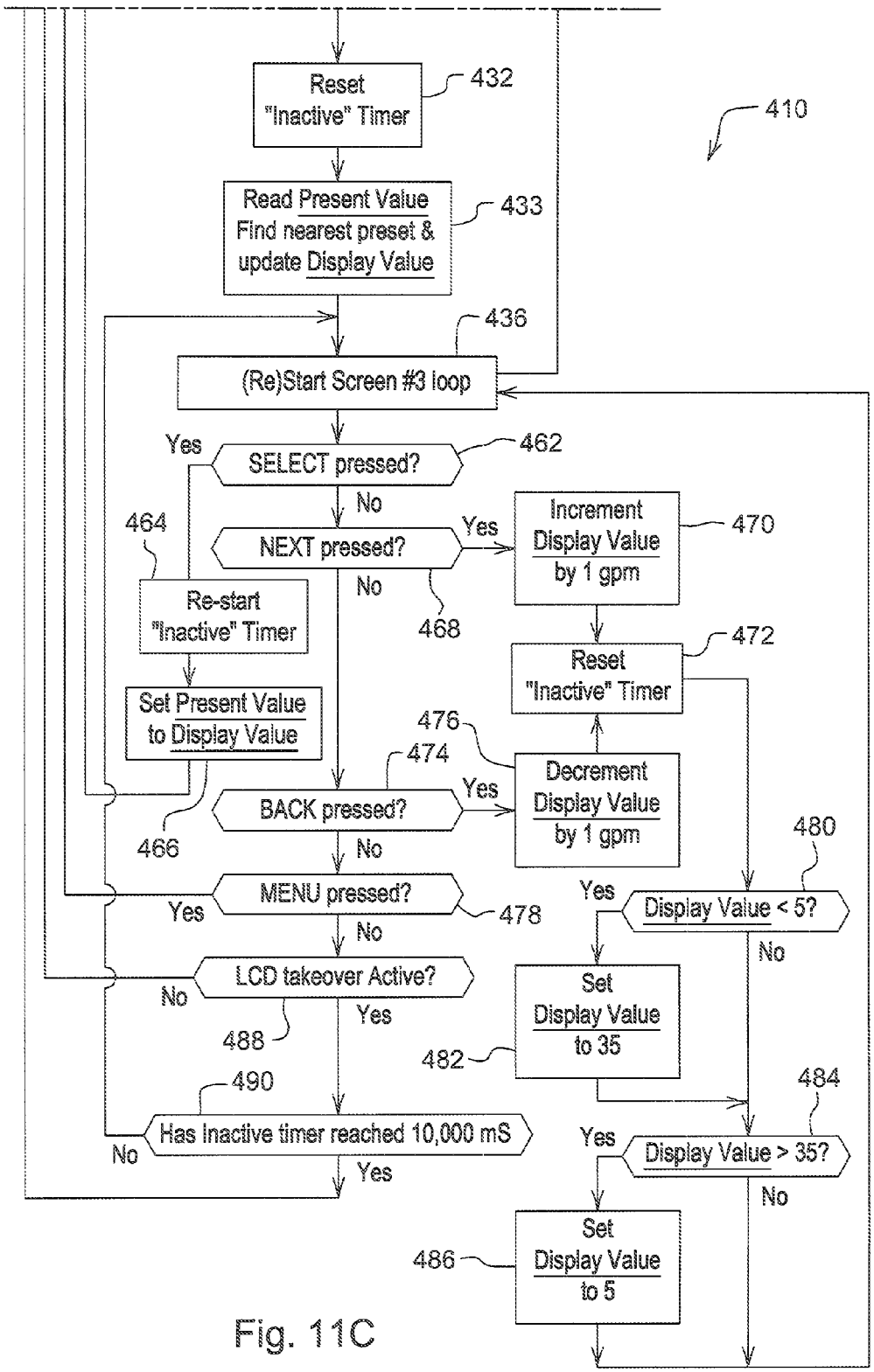
Figure 12A:
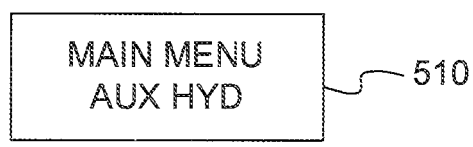
FIGS. 12A-12D show various screens that are displayed on the display of the operator interface.
Figure 12B:
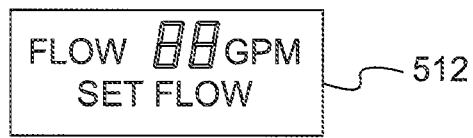
Figure 12C:
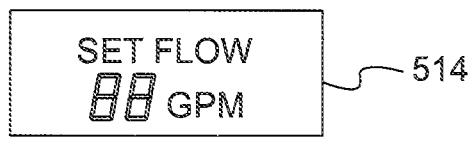
Figure 12D:
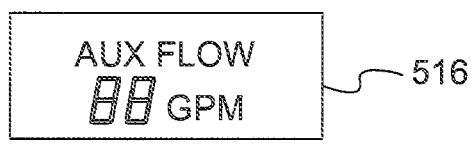

Referring to FIGS. 11-12D, the control scheme 410 and various screens are shown. Starting with FIGS. 11 and 11A, in act 412, the operator starts the control scheme 410 when the operator successively actuates a MENU input device 120a as needed to scroll through various screens of a menu structure stored in a memory device 38 of the interface 30 to view an initial screen 510 (FIG. 12A) and then actuates a SELECT input device 120b so as to start the flow setpoint selection process. This actuation of the SELECT input device 120b causes the FHC 34 to store a "1" in a activate-selection-process location of its memory device 38, this "1" meaning that the flow setpoint selection process has been activated. At this point, the FHC 34 takes over control of the display 118 and maintains control during the flow setpoint selection process.

In act 414, the FHC 34 determines whether the flow setpoint selection process has commenced. It does so by determining whether a "1" has been stored in the activate-selection-process location. If yes, the control scheme 410 advances to act 416 in which the FHC 34 writes a "2" to the activate-selection-process location, acknowledging that primary control of the flow setpoint selection process has now transitioned to the FHC 34. If no, the FHC 34 continues to monitor the activate-selection-process location.

In act 418, the FHC 34 disables operation of the circuit 322, if applicable (sometimes referred to as "hammer hydraulics" as in FIG. 11A, even though a tool other than a hammer could certainly be operated by the circuit 322).

In act 420, a timer is started to determine whether a predetermined period of time of inactivity elapses. If the input devices 120 are inactive for this predetermined period of time (e.g., 10 seconds), the control scheme 410, and thus the flow setpoint selection process, stops.

In act 422, a display value of the flow setpoint is set equal to a present value of the flow setpoint so that the displace 118 will display the present value of the flow setpoint in a screen loop 423 (referred to sometimes as "screen #2 loop"). In act 424, screen loop 423 is started.

Referring to FIGS. 11 and 11B, the screen loop 423 is shown. The purpose of screen loop 423 is to display the present value of the flow setpoint. In act 425, a screen flow value is set equal to the display value. In act 426, the FHC 34 operates the display 118 to display the screen flow value, which, in effect, is the present value of the flow setpoint, in a screen 512 (FIG. 12B). In a series of acts 428 that follow, display 118 alternates between blinking the term "SET FLOW" of screen 512 ON and OFF in a loop.

Referring back to FIG. 11A, in act 430, the FHC 34 determines if the SELECT input device 120b has been actuated while the screen loop 423 is activated. If no, the control scheme 410 advances to act 434. If yes, this means the operator desires to select a new flow setpoint, and the control scheme 410 advances to act 432 (FIG. 11C)

In act 434, the FHC 34 determines if the MENU input device 120a or the BACK input device 120d has been actuated. If no, the control scheme advances to act 148. If yes, the control scheme 410 advances to act 450.

In act 448, the FHC 34 determines if the display 118 is under the control of the FHC 34. If yes, the control scheme 410 advances to act 452. If no, the control scheme 410 advances to act 450.

In act 452, the FHC 34 determines if the predetermined time period of inactivity has elapsed. If no, the control scheme 410 returns to act 430. If yes, the control scheme 410 advances to act 454 stops the active screen loop (e.g., loop 423).

In act 450, the FHC 34 writes a "O" to the activate-selection-process location. In act 456, the FHC 34 enables operation of the circuit 322, if applicable. In act 457, a screen flow value is set equal to the present value. In act 458, the FHC 34 operates the display 118 to display the screen flow value, which, in effect, is the present value of the flow setpoint, in a screen 516 (FIG. 12D). After waiting a brief moment in act 459 (e.g., 1.5 seconds), in act 460, the FHC 34 operates the display 118 to display a blank screen, and cancels takeover of the display 118 by the FHC 34, reverting control of the display 118 back to the interface 30 and the processor 36 thereof.

Referring to FIGS. 11 and 11C, as noted above, if the operator actuates the SELECT input device 120b while the screen loop 432 is active, meaning the operator desires to select a new flow setpoint, the control scheme 410 advances to act 432 in which the FHC 34 resets the timer. After doing so, in act 433, the present value is read and the display value is updated. In act 436, the FHC 34 starts a screen loop 435 (referred to sometimes as "screen #3 loop").

Referring to FIG. 11B, the screen loop 435 is shown. The purpose of the screen loop 436 is to prompt the operator to select the flow setpoint. In act 437, a screen flow value is set equal to the display value. In act 438, the FHC 34 operates the display 118 to display the screen flow value, which, in effect, is the present value of the flow setpoint, in a screen 514 (FIG. 12C). In a series of acts 440 that follow, display 118 alternates between blinking the screen flow value of the flow setpoint and the term "GPM" of screen 514 ON and OFF in a loop.

Referring back to FIG. 11C, the control scheme 410 proceeds to allow the operator to select a flow setpoint. In act 462, the FHC 34 determines if the SELECT input device 120b is actuated again. If yes, the control scheme 410 advances through acts 464 and 466 to act 450. In act 464, the FHC 34 resets the time, and, in act 466, the present value is set equal to the display value is set to the present value of the flow setpoint. If no, the control scheme 410 advances to act 468.

In act 468, the FHC 34 determines if the NEXT input device 120c has been actuated. If yes, the control scheme 410 advances to act 470 and then act 472. In act 470, the FHC 34 increments the display value by 1 (e.g., 1 gallon per minute). In act 472, the FHC 34 resets the time. If no, the control scheme 410 advances to act 474.

In act 474, the FHC 34 determines if the BACK input device 120d has been actuated. If yes, the control scheme 410 advances to act 476 and then act 472. In act 476, the FHC 34 decrements the display value by 1 (e.g., 1 gallon per minute). If no, the control scheme 410 advances to act 478.

After act 472, the control scheme 410 proceeds to limit the flow setpoint to a predetermined setpoint range (e.g., between 5 gallons per minute and 35 gallons per minute). In so doing, the control scheme 410 advances to act 480 in which the FHC 34 determines if the display value is less than a predetermined lower limit of the predetermined setpoint range (e.g., 5 gallons per minute). If yes, the control scheme 410 advances to act 482 in which the FHC 34 sets the display value to a predetermined upper limit of the predetermined setpoint range (e.g., 35 gallons per minute), after which the control scheme 410 advances to act 484. If no, the control scheme 410 advances to act 484.

In act 484, the FHC 34 determines if the display value is greater than the predetermined upper limit. If yes, the control scheme 410 advances to act 486 in which the FHC 34 sets the display value to the predetermined lower limit (e.g., 5 gallons per minute), after which the control scheme 410 advances to act 436. If no, the control scheme 410 advances to act 436. In act 436, the loop 435 is restarted, displaying the current display value (i.e., a new value of the flow setpoint) and prompting further operator input, as discussed above.

In act 478, the FHC 34 determines if the MENU input device 120a has been actuated. If yes, the control scheme 410 advances to act 450. If no, the control scheme 410 advances to act 488.

In act 488, the FHC 34 determines if the display 118 is under the control of the FHC 34. If no, the control scheme 410 advances to act 450. If yes, the control scheme 410 advances to act 490.

In act 490, the FHC 34 determines if the predetermined period of time of inactivity has elapsed (e.g., 10 seconds). If no, the control scheme 410 returns to acts 462. If yes, the control scheme 410 advances to act 450.

Although the control scheme 410 has been discussed mainly in connection with the circuit 322, it is to be understood that it could be used also with the circuit 22. For example, in the loader backhoe case, the control scheme 410 may be used with the circuit 22 for the loader portion 18 and/or the circuit 22 for the backhoe portion 20, in order for the operator to select a flow setpoint for operation of an associated auxiliary tool 12 in the continuous mode.

It is to be understood that the various signals disclosed herein may include not only times when the respective signal has a non-zero amplitude but also times when the respective signal may have a zero amplitude (i.e., OFF). The term "signal" thus applies to both situations.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method of operating an apparatus comprising a work machine adapted to travel on land and an auxiliary tool attached to the work machine and comprising a hydraulic actuator configured to move the auxiliary tool, the work machine comprising an operator's station, an operator interface located in the operator's station, an auxiliary electro-hydraulic circuit for operating the hydraulic actuator of the auxiliary tool when the auxiliary tool is attached to the work machine, and an auxiliary input device configured to control an operation of the auxiliary electro-hydraulic circuit in a first mode and in a second mode, hydraulic flow from the auxiliary electro-hydraulic circuit being proportional to a displacement of the auxiliary input device in the first mode and being based on a predetermined displacement of the auxiliary input device in the second mode, the method comprising:

receiving from the operator interface an electrical setpoint signal representative of a flow setpoint selected by an operator via the operator interface, and in response to the predetermined displacement of the auxiliary input device in the second mode, electrically operating the auxiliary electro-hydraulic circuit so as to output flow from the auxiliary electro-hydraulic circuit to the hydraulic actuator of the auxiliary tool at a substantially constant magnitude represented by the flow setpoint to move the auxiliary tool.

2. The method of claim 1, wherein the receiving comprises displaying a present value of the flow setpoint.

3. The method of claim 2, wherein the receiving comprises prompting an operator to select a new value for the flow setpoint.

4. The method of claim 3, wherein the receiving comprises receiving a new value for the flow setpoint, and displaying the new value.

5. The method of claim 4, wherein receiving the new value comprises monitoring output of at least one operator input device of the operator interface.

6. The method of claim 1, wherein the receiving comprises receiving a value for the flow setpoint, and displaying the value.

7. The method of claim 1, wherein the receiving comprises monitoring output of at least one operator input device of the operator interface.

8. The method of claim 1, wherein the receiving comprises limiting the flow setpoint to a predetermined setpoint range.

9. The method of claim 1, comprising operating the operator interface from the operators station.

10. The method of claim 1, further comprising receiving a mode selection signal representative of a mode selected by an operator for operating the auxiliary electro-hydraulic circuit, the mode being selected from at least the first mode and the second mode, in the first mode the flow from the auxiliary electro-hydraulic circuit to the hydraulic actuator being proportional to the displacement of the auxiliary input device, and in the second mode the flow from the auxiliary electro-hydraulic circuit to the hydraulic actuator being at the substantially constant magnitude represented by the flow setpoint.

11. An apparatus comprising a work machine adapted to travel on land and an auxiliary tool attached to the work machine and comprising a hydraulic actuator configured to move the auxiliary tool, the work machine comprising:
an operator's station;
an operator interface located in the operator's station,
an auxiliary electro-hydraulic circuit adapted to operate the hydraulic actuator of the auxiliary tool when the auxiliary tool is attached to the work machine,
an auxiliary input device configured to control an operation of the auxiliary electro-hydraulic circuit in a first mode and in a second mode, hydraulic flow from the auxiliary electro-hydraulic circuit being proportional to a displacement of the auxiliary input device in the first mode and being based on a predetermined displacement of the auxiliary input device in the second mode, and
a controller unit that communicates with the operator interface and the auxiliary electro-hydraulic circuit, the controller unit adapted to:
receive from the operator interface an electrical setpoint signal representative of a flow setpoint selected by an operator via the operator interface, and
in response to the predetermined displacement of the auxiliary input device in the second mode, electrically operate the auxiliary electro-hydraulic circuit so as to output flow from the auxiliary electro-hydraulic circuit to the hydraulic actuator of the auxiliary tool at a substantially constant magnitude represented by the flow setpoint to move the auxiliary tool.

12. The apparatus of claim 11, wherein the operator interface comprises a display, and the controller unit is adapted to operate the display to display a present value of the flow setpoint.

13. The apparatus of claim 12, wherein the controller unit is adapted to operate the display to prompt an operator to select a new value for the flow setpoint.

14. The apparatus of claim 13, wherein the user interface comprises at least one operator input device, and the controller unit is adapted to monitor output of the at least one operator input device, receive a new value for the flow setpoint in response to actuation of the at least one operator input device, and operate the display to display the new value.

15. The apparatus of claim 11, wherein the operator interface comprises a display, and the controller unit is adapted to operate the display to prompt an operator to select a value for the flow setpoint.

16. The apparatus of claim 11, wherein the user interface comprises a display and at least one operator input device, and the controller unit is adapted to monitor output of the at least one operator input device, receive a value for the flow setpoint in response to actuation of the at least one operator input device, and operate the display to display the value.

17. The apparatus of claim 11, wherein the controller unit is adapted to limit the flow setpoint to a predetermined setpoint range.

18. The apparatus of claim 11, wherein the operator's station comprises a cab in which the operator interface is located.

19. The apparatus of claim 11, further including an auxiliary mode selector configured to select an operating mode of the electro-hydraulic circuit, the operating mode being selected from at least the first mode and the second mode, in the first mode the controller unit electrically operating the auxiliary electro-hydraulic circuit so as to output flow from the auxiliary electro-hydraulic circuit to the hydraulic actuator proportionally to the displacement of the auxiliary input device, and in the second mode the controller unit electrically operating the auxiliary electro-hydraulic circuit so as to output flow from the auxiliary electro-hydraulic circuit to the hydraulic actuator at the substantially constant magnitude represented by the flow setpoint.

20. The apparatus of claim 11, wherein the hydraulic actuator includes at least one of a hydraulic cylinder and a hydraulic motor.

* * * * *